United States Patent [19]

Osaki et al.

[11] Patent Number: 5,346,679
[45] Date of Patent: Sep. 13, 1994

[54] METHOD FOR REDUCTION OF CARBON DIOXIDE, CATALYST FOR THE REDUCTION, AND METHOD FOR PRODUCTION OF THE CATALYST

[75] Inventors: Toshihiko Osaki, Nishio; Hiroshi Taoda, Nagoya; Hiromi Yamakita, Owari-Asahi, all of Japan

[73] Assignees: Agency of Industrial Science & Technology; Ministry of International Trade & Industry, Tokyo, Japan

[21] Appl. No.: 19,646

[22] Filed: Feb. 17, 1993

Related U.S. Application Data

[62] Division of Ser. No. 925,663, Aug. 7, 1992, abandoned.

[30] Foreign Application Priority Data

Aug. 15, 1991 [JP] Japan ................................ 3-229518
Aug. 15, 1991 [JP] Japan ................................ 3-229519

[51] Int. Cl.$^5$ .............................................. C01B 31/18
[52] U.S. Cl. .................................. 423/210; 423/415.1; 423/418.2; 423/437 R
[58] Field of Search .......... 423/437 A, 437 M, 415 A, 423/210, 415.1, 418.2

[56] References Cited

U.S. PATENT DOCUMENTS

| | | | |
|---|---|---|---|
| 3,429,679 | 2/1969 | Friedman et al. | 48/147 |
| 3,479,149 | 11/1969 | Frilette | 423/415 A |
| 4,265,868 | 5/1981 | Kamody | 423/415 A |
| 4,514,517 | 4/1985 | Ho et al. | 502/220 |
| 4,583,993 | 4/1986 | Chen | 48/197 R |

FOREIGN PATENT DOCUMENTS 53-119798  10/1978  Japan .................................. 423/415 A

OTHER PUBLICATIONS

"Introduction to Physics for Scientists & Engineers" by F. S. Bueche, 2nd ed., McGraw-Hill Co. 1975 p. 126.
"Preparation & Purification of Carbon Dioxide & Carbon Monoxide" by R. P. A. Sneeden, vol. 8, Pergamon Press pp. 2–14 (1982).

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

A catalyst for the reduction of carbon dioxide into carbon monoxide includes tungsten sulfide alone or at least one catalyst support selected from among alumina, silica, activated carbon, zeolite, iron oxide, zirconia, titania, ferrite, yttria thoria, lanthania, neodymia and activated clay and tungsten sulfide deposited on the support. The catalyst is produced, for example, by a method including the steps of adding the support to an aqueous solution of ammonium tetrathiotungstate, an aqueous ammoniacal solution of it or an acid solution of it, drying the resultant solution and heating the resultant dried solid in a current of hydrogen, nitrogen, argon or helium, thereby decomposing the solid.

5 Claims, No Drawings

METHOD FOR REDUCTION OF CARBON DIOXIDE, CATALYST FOR THE REDUCTION, AND METHOD FOR PRODUCTION OF THE CATALYST

This is a division of application Ser. No. 07/925,663 filed on Aug. 7, 1992 now abandoned.

BACKGROUND OF THE INVENTION

1. Field of the Invention

This invention relates to a method for the reduction of carbon dioxide into carbon monoxide, a catalyst for use in the reduction of carbon dioxide, and a method for the production of the catalyst.

In recent years, the earth's warming due to an increase in the carbon dioxide concentration of the atmospheric air has been arousing the public anxiety. Though the carbon dioxide has no toxicity in itself, it is now discharged in a colossal amount of about 20 billion tons annually into the atmospheric air. In the circumstances, the desirability of preventing a further increase in the carbon dioxide concentration in the atmospheric air has been finding widespread recognition. This prevention dictates an extreme decrease in the consumption of energy and an increase in the reclamation of produced carbon dioxide. The carbon monoxide which is obtained by reducing carbon dioxide can be utilized as a raw material for products of synthesis and as a fuel. This invention concerns the reduction of carbon dioxide mentioned above.

2. Description of the Prior Art

The method of reduction and fixation of carbon dioxide which resorts to catalytic hydrogenation of the carbon dioxide, i.e. the reduction of the carbon dioxide by reaction with hydrogen, possesses a prominent capacity for reducing and fixing the carbon dioxide per unit time per unit surface area and allows treatment of the carbon dioxide in a large amount as compared with the method of photochemical reaction, the method of electrochemical reaction, the method of polymer synthesis and the method of organic synthesis. It further enjoys the advantage that it allows application thereto of the technique of hydrocarbon synthesis by the Fischer-Tropsch process and, by reason of the vapor-phase reaction in mode of operation, permits the product of the reaction to be easily separated. Heretofore, for the reduction and fixation of carbon dioxide by the catalytic hydrogenation, the method which uses a catalyst of such noble metal as ruthenium or rhodium has been studied [as reported by F. Solymosi and A. Erdohelyi, J. Mol. Catal., Vol. 8, 471 (1980)].

This method, however, is disadvantageous in (1) that the catalyst to be used therein is expensive and is easily poisoned by such sulfur compounds as hydrogen sulfide and sulfur dioxide and is deprived quickly of its catalytic activity, (2) that this reaction which reduces carbon dioxide into methane is an exothermic reaction whose product has a lower energy than the raw material and, therefore, suffers from poor energy yield, (3) that more often than not the reaction fails to proceed smoothly unless it is carried out under high pressure and (4) that since the reaction is generally carried out at an elevated temperature and this elevation of temperature necessitates use of a fossil fuel, the reaction brings about no substantial repression of the occurrence of carbon dioxide.

In the circumstances, therefore, a desire is expressed strongly for a method which is capable of reducing carbon dioxide into carbon monoxide economically by a simple procedure with a notably small consumption of energy.

The present inventors have conducted various studies with a view to attaining this desire.

They have taken notice of the fact that tungsten sulfide which is used as a catalyst for hydrodesulfurization and a hydrogenating catalyst for ethylene hydrocarbons, for example, features the quality of defying the poisoning action of such sulfur compounds as hydrogen sulfide and sulfur dioxide gas, producing no toxic action, exhibiting strong resistance to acids, and enjoying durability, that the necessity for using an expensive noble metal can be obviated and that tungsten sulfide is black and amply absorbs the sunbeams. They have consequently conceived an idea that the use of tungsten sulfide results in accomplishment of the desire mentioned above. This invention has been perfected as a result.

SUMMARY OF THE INVENTION

This invention relates to a method for the reduction of carbon dioxide by a procedure comprising the steps of introducing carbon dioxide and hydrogen gas onto tungsten sulfide in a simple form or tungsten sulfide deposited on a catalyst support and heating the resultant or exposing it to the sunbeams, thereby causing carbon dioxide to react with hydrogen and consequently effecting conversion of carbon dioxide into carbon monoxide, a method for the production of a catalyst deposited on a catalyst support by a procedure comprising the steps of adding a support to an ammonium tetrathiotungstate solution or ammonium tungstate solution, drying the support-containing solution and thermally decomposing the resultant dried composite under specific conditions, a method for the production of a catalyst deposited on a support by a procedure comprising the steps of depositing tungsten trisulfide on a support and subjecting the resultant composite to thermal decomposition under specific conditions, and a catalyst comprising at least one catalyst support selected from the group consisting of alumina, silica, activated carbon, zeolite, iron oxide, zirconia, titania, ferrite, yttria, thoria, lanthania and neodymia and tungsten sulfide deposited on the support.

DESCRIPTION OF THE PREFERRED EMBODIMENTS

The present inventors are the first to have realized use of tungsten sulfide as a catalyst for the reduction of carbon dioxide. Owing to the use of this catalyst, the reduction of carbon dioxide is attained at a relatively low temperature under normal pressure. The catalyst also enables the reduction by the sunbeams to proceed efficiently. The reduction by the use of this catalyst is highly economic because the catalyst is not poisoned by any sulfur compound and rich in durability.

When the tungsten sulfide catalyst of this invention is deposited on the specific catalyst support mentioned above, the resultant composite catalyst notably gains in surface area and a reducing quality.

The tungsten sulfide catalysts which are effectively usable in this invention include those formed of tungsten disulfide and tungsten trisulfide, those additionally containing lower and higher sulfides and those containing tungsten oxide and metallic tungsten in addition thereto, for example. Particularly, the catalyst of tungsten disulfide or lower sulfides of tungsten which is porous and possesses a large surface area is desirable.

The tungsten sulfide to be used in this invention can be produced by any of (1) the method which comprises heating a mixture consisting of tungsten and sulfur in a stated ratio in a current of nitrogen at a temperature in the range between 800° and 900° C. for 24 hours, (2) the method which comprises heating tungsten trioxide and potassium carbonate and causing the heated compounds to react with sulfur, hydrogen sulfide, carbon disulfide, etc., (3) the method which comprises heating tungsten hexachloride in a current of hydrogen sulfide and (4) the method which comprises melting and electrolyzing a mixture consisting of tungsten trioxide, borax, sodium sulfate and sodium fluoride. The product of (5) the method which comprises preparing tungstic acid by adding a strong acid to such a tungstate as scheelite or wolframite, solving the tungstic acid in aqua ammonia thereby converting the acid into ammonium tungstate, saturating the ammonium tungstate with hydrogen sulfide or ammonium sulfide thereby producing ammonium tetrathiotungstate, and thermally decomposing the tetrathiotungstate in a current of hydrogen or nitrogen or an inert gas such as argon or helium at a temperature in the range between 400° and 700° C. possesses a particularly high catalytic activity. Otherwise, the tungsten sulfide may be prepared by (6) the method which comprises thermally decomposing tungsten trisulfide in a current of hydrogen or nitrogen or an inert gas such as argon or helium or (7) the method which comprises heating tungsten trioxide in a current of hydrogen sulfide or a current of the mixture of hydrogen sulfide with hydrogen.

The S/W molar ratio of the tungsten sulfide is desired to be not more than 2. The temperature of the thermal decomposition for the production of tungsten sulfide is most desirable in the range between 450° and 550° C. If this temperature exceeds the upper limit of this range, the produced tungsten sulfide acquires an unduly low catalytic activity because the heating entails advanced sintering and a consequent decrease in the surface area of the catalyst. If the heating temperature is less than 400° C., the produced tungsten sulfide acquires an unduly low catalytic activity because the S/W molar ratio is suffered to exceed 2. The heating time is desired to be approximately one hour. It is desired to be decreased in proportion as the heating temperature is increased. If the heating time is unduly long, the produced tungsten sulfide suffers from an unduly low catalytic activity because the heating entails advanced sintering and the catalyst acquires an unduly small surface area.

The catalyst supports which are effectively usable in this invention include alumina, silica, activated carbon, zeolite, activated clay, iron oxide, zirconia, titania, ferrite, yttria, thoria, lanthania, neodymia and mixtures thereof, for example. The support is desired to be in the form of fine powder consisting of minute particles having a porous texture and a large surface area.

The supported tungsten sulfide catalyst to be used in this invention for the reduction of carbon dioxide is prepared by saturating an aqueous solution of ammonium tungstate with hydrogen sulfide or ammonium sulfide thereby forming ammonium tetrathiotungstate, adding with simultaneous stirring a catalyst support in the form of a porous solid, a fine powder, or sol to (a) an aqueous solution, (b) an aqueous ammoniacal solution or (c) a nitric, hydrochloric or sulfuric acid solution of the ammonium tetrathiotungstate, drying the resultant composite liquid, and thermally decomposing the dried composite in a current of hydrogen or nitrogen or such an inert gas as argon or helium. It may be otherwise prepared by heating and decomposing tungsten trisulfide deposited on a support in a current of hydrogen or nitrogen or such an inert gas as argon or helium. Alternatively, it may be prepared either by adding a support to an aqueous solution of ammonium tungstate, drying the resultant composite liquid, heating the dried composite in the open air or in a current of oxygen, and subsequently heating the composite in a current of hydrogen sulfide or a current of the mixture of hydrogen sulfide with hydrogen or by heating tungsten trioxide deposited on a support in a current of hydrogen sulfide or a current of the mixture of hydrogen sulfide with hydrogen. The heating temperature in this case is desired to be not lower than 400° C. and not higher than 700° C.

Now, the method for effecting the deposition of tungsten trisulfide on a catalyst support will be described.

a) The deposition is accomplished by adding while simultaneously stirring a support in the form of a porous solid, a fine powder or sol to an aqueous solution of ammonium tungstate, saturating the resultant composite mixture with hydrogen sulfide or ammonium sulfide, neutralizing the saturated composite with such an acid as hydrochloric acid or sulfuric acid, filtering the neutralized composite and thermally drying the filtrate under an atmosphere of nitrogen or an inert gas at a temperature in the range between 100° and 150° C.

b) The deposition is also attained by adding while simultaneously stirring a support in the form of a porous solid, a fine powder or sol to a solution of ammonium tungstate in ammonium sulfide or an aqueous ammonia solution, drying the resultant composite mixture, heating the dried composite in a current of oxygen and subsequently heating the composite in a current of hydrogen sulfide or the mixture of hydrogen and hydrogen sulfide at a temperature in the range between 350° and 600° C.

c) Alternatively, the deposition is fulfilled by adding while simultaneously stirring a support in the form of a porous solid, a fine powder or sol to an aqueous solution or an aqueous ammoniacal solution of ammonium tungstate or a solution of ammonium tungstate in such an acid as nitric acid, hydrochloric acid or sulfuric acid, drying the resultant composite mixture and heating the dried composite in the air or in a current of oxygen. The heating temperature in this case is desired to be not lower than 400° C. and not higher than 700° C., most desirably be in the range between 450° and 550° C.

Practically, the amount of tungsten sulfide to be deposited on a support is desired to be in the range between 0.1 and 40%, based on the amount of the support.

The reaction gas to be used in this invention is a mixed gas consisting of carbon dioxide and hydrogen. It may contain an inert gas such as argon or helium, nitrogen gas or hydrogen sulfide. The molar ratio of carbon dioxide/hydrogen is desired to be as close to 1 as possible. Practically, the range of this molar ratio is between 0.1 and 5.

When a gas containing carbon dioxide and hydrogen is passed through the tungsten sulfide catalyst obtained as described above and simultaneously heated with waste heat or by exposure to the sunbeams, the carbon dioxide is caused to react with the hydrogen on the catalyst and consequently converted into carbon monoxide at a selectivity of nearly 100%. Otherwise, the gas containing carbon dioxide and hydrogen may be passed in a heated state through the tungsten sulfide catalyst. Similarly in this case, the carbon dioxide is caused to react with the hydrogen on the catalyst and consequently converted into carbon monoxide at a selectivity of nearly 100%.

When the solar energy is utilized as the heat source in the method of this invention, a solar concentrator selected from among side mirror reflectors, linear compound parabolic concentrators, linear parabolic concentrators, linear parabolic concentrators simulated with a plane mirror, paraboloidal concentrators, linear Fresnel lens solar concentrators and circular Fresnel lens solar concentrators may be used. When the tungsten sulfide catalyst is set in place inside the heat absorber or near the focal point of the solar concentrator and the gas containing carbon dioxide and hydrogen is introduced into the concentrator, the carbon dioxide is caused to react with the hydrogen and consequently converted into carbon monoxide. The reaction of the carbon dioxide with the hydrogen is promoted because tungsten sulfide is black and amply absorbs the sunlight and further because it is a semiconductor and is excited on exposure to the light.

This invention is directed to a highly practical method for the reduction of carbon dioxide which enables the carbon dioxide to be selectively converted into carbon monoxide under mild conditions such as relatively low temperature and normal pressure, a tungsten sulfide catalyst for the reduction of carbon dioxide which allows the reduction to be accomplished by the method described above and also enjoys durability, and a method for the production of this catalyst.

The tungsten sulfide contemplated by this invention defies the poisoning action of sulfur compounds, forms an inexpensive and innoxious substance, and features strong resistance to acids and durability. By the method of this invention, the carbon dioxide undergoes a reverse water gas shift reaction and consequent selective conversion into carbon monoxide. Since this reaction is a vapor-phase reaction, it allows treatment of a large amount of carbon dioxide. Since this reaction proceeds endothermally, it enjoys a high energy yield. When waste heat or the solar energy is utilized as the heat source, the carbon monoxide obtained as the product of the reaction in effect has accumulated the heat. Thus, the reaction can be used for a heat pump. The carbon monoxide as the product of the reaction can be utilized as a fuel in its unaltered form. Since it can be utilized for conversion by the existing C1 chemical technique into raw materials for synthetic products and methanol which is now attracting keen attention as the fuel for automobiles, this invention is highly effective from the standpoint of the conservation of the earth's environment and from the viewpoint of saving of energy.

Now, this invention will be described more specifically below with reference to working examples.

EXAMPLE 1

A tungsten sulfide catalyst (S/M molar ratio=1.99) was obtained by heating ammonium tetrathiotungstate in a current of hydrogen at 450° C. for one hour. A U-shaped flow reactor of quartz 1 cm in diameter was packed with 300 mg of the produced catalyst. A mixed gas consisting of carbon dioxide and hydrogen at a ratio of 1:1 was passed in a heated state through the reactor at a flow rate of 20 ml/min to induce reaction. The reaction product was analyzed by gas chromatography. It was consequently found that the conversion of carbon dioxide to carbon monoxide was 3% at 300° C., 15% at 400° C. and 32% at 500° C. No other reaction product than carbon monoxide was found in the effluent from the reactor.

EXAMPLE 2

To an aqueous ammoniacal solution of ammonium tetrathiotungstate, a fine powder of titania (500% by weight based on the amount of the ammonium tetrathiotungstate) as a catalyst support was added as kept in a stirred state. The resultant composite mixture was dried under vacuum at room temperature and the dried mixture was heated in a current of hydrogen at 450° C. for one hour. Consequently, there was obtained a catalyst which consisted of titania as a support and tungsten sulfide (S/W molar ratio=1.99) deposited on the support. The tungsten sulfide content of this catalyst was 14% by weight based on the amount of titania.

A U-shaped flow reactor of quartz 1 cm in diameter was packed with 800 mg of the produced catalyst. A mixed gas consisting of carbon dioxide and hydrogen at a ratio of 1:1 was passed in a heated state through the reactor at a flow rate of 20 ml/min to induce reaction. The reaction product was analyzed by gas chromatography. It was consequently found that the conversion of carbon dioxide into carbon monoxide was 6% at 300° C., 20% at 400° C. and 31% at 500° C. No other reaction product than carbon monoxide was found in the effluent from the reactor.

EXAMPLE 3

A U-shaped flow reactor of quartz 1 cm in diameter was packed with 300 mg of commercially available tungsten disulfide (S/W=2). In the same manner as in Example 1, a mixed gas consisting of carbon dioxide and hydrogen at a ratio of 1:1 was passed in a heated state through the reactor at a flow rate of 20 ml/min to induce reaction. The produced reaction product was analyzed by gas chromatography. It was consequently found that the conversion of carbon dioxide into carbon monoxide was 1% at 300° C., 2% at 400° C. and 7% at 500° C.

EXAMPLE 4

To an aqueous ammoniacal solution of ammonium tetrathiotungstate, alumina pellets (600% by weight based on the amount of said ammonium tetrathiotungstate) as a catalyst support was added in a stirred state. The resultant composite mixture was dried under vacuum at room temperature and the dried mixture was heated in a current of hydrogen at 500° C. for 50 minutes. As a result, there was obtained a catalyst which consisted of alumina as a support and tungstate sulfide (S/W=1.98) deposited on the support. The tungsten sulfide content of this catalyst was 12% by weight based on the amount of alumina.

Through a bed of 500 mg of the produced catalyst, a mixed gas consisting of carbon dioxide and hydrogen at a ratio of 1:1 was passed in a heated state at a flow rate of 20 ml/min to induce reaction. The reaction product was analyzed by gas chromatography. It was consequently found that the conversion of carbon dioxide into carbon monoxide was 5% at 300° C., 19% at 400° C. and 31% at 500° C. No other reaction product than carbon monoxide was found in the effluent from the reactor.

EXAMPLE 5

Tungsten trisulfide deposited on 90% by weight of activated carbon was heated in a current of argon gas at 480° C. for 55 minutes. As a result, there was obtained a catalyst which consisted of activated carbon as a support and tungsten sulfide (S/W=2.05) deposited on the activated carbon and had a tungsten sulfide content of 79% by weight based on the amount of the activated carbon. In the same manner as in Example 1, through a bed of 500 mg of the produced catalyst, a mixed gas consisting of carbon dioxide, hydrogen and argon at a ratio of 3:3:1 was passed in a heated state at a flow rate of 30 ml/min to induce reaction. When the reaction product was analyzed by gas chromatography, it was found that the conversion of carbon dioxide into carbon monoxide was 6% at 300° C., 17% at 400° C. and 26% at 500° C.

EXAMPLE 6

Tungsten trisulfide deposited on 85 weight % of iron sesquioxide was heated in a current of helium gas at 50° C. for 30 minutes. As a result, there was obtained a catalyst which consisted of iron sesquioxide as a support and tungsten sulfide (S/W=1.96) deposited on the support and had a tungsten sulfide content of 84% by weight based on the amount of iron sesquioxide. In the same manner as in Example 1, through a bed of 600 mg of the produced catalyst, a mixed gas consisting of carbon dioxide, hydrogen and hydrogen sulfide at a ratio of 5:5:1 was passed in a heated state in a flow rate of 40 ml/min to induce reaction. The reaction product was analyzed by gas chromatography. It was consequently found that the conversion of carbon dioxide into carbon monoxide was 7% at 300° C., 18% at 400° C. and 25% at 500° C.

EXAMPLE 7

To a nitric acid aqueous solution of ammonium tetrathiotungstate, a fine powder of zeolite (800% by weight based on the amount of the ammonium tetrathiotungstate) as a support was added in a stirred state. The resultant composite mixture was dried under vacuum at room temperature. The dried mixture was heated in a current of nitrogen at 500° C. for one hour. As a result, there was obtained a catalyst which consisted of zeolite as a support and tungsten sulfide (S/W=1.98) deposited on the support and had a tungsten sulfide content of 9% by weight based on the amount of the support.

In the same manner as in Example 1, through a bed of 400 mg of the produced catalyst, a mixed gas consisting of carbon dioxide and hydrogen at a ratio of 1:1 was passed in a heated state in a flow rate of 30 ml/min to induce reaction. The reaction product was analyzed by gas chromatography. As a result, it was found that the conversion of carbon dioxide into carbon monoxide was 5% at 300° C., 12% at 400° C. and 25% at 500° C.

EXAMPLE 8

To an aqueous solution of ammonium tungstate, a fine powder of yttria (700% by weight based on the amount of ammonium tungstate) was added in a stirred state. The resultant composite mixture was dried at room temperature. The dried mixture was heated in a current of oxygen at 500° C. for one hour and further heated in a current of hydrogen sulfide at 500° C. for one hour. As a result, there was obtained a catalyst which consisted of yttria as a support and tungsten sulfide (S/W=1.98) deposited on the support. The tungsten sulfide content of this catalyst was found to be 10% by weight based on the amount of yttria. In the same manner as in Example 1, through a bed of 500 mg of the produced catalyst, a mixed gas consisting of carbon dioxide and hydrogen at a ratio of 1:1 was passed in a heated state in a flow rate of 30 ml/min to induce reaction. The reaction product was analyzed by gas chromatography. It was consequently found that the conversion of carbon dioxide into carbon monoxide was 5% at 300° C., 18% at 400° C. and 30% at 500° C. No other reaction product than carbon monoxide was found in the effluent from the reactor.

EXAMPLE 9

To an aqueous solution of ammonium tungstate, a fine powder of ferrite (900% by weight based on the amount of ammonium tungstate) as a support was added in a stirred state. The resultant mixture was saturated with ammonium sulfide and then neutralized with hydrochloric acid. The resultant composite mixture was filtered. The filtrate was dried overnight under an atmosphere of nitrogen at 120° C. and then heated in a current of the mixed gas consisting of hydrogen sulfide and hydrogen at a rate of 1:1 at 480° C. for 80 minutes. As a result, there was obtained a catalyst which consisted of ferrite as a support and tungsten sulfide (S/W=2.00) deposited on the support. The tungsten sulfide content of this catalyst was found to be 8% by weight based on the amount of ferrite. In the same manner as in Example 1, through a bed of 600 mg of the produced catalyst, a mixed gas consisting of carbon dioxide, hydrogen and argon at a ratio of 2:2:1 was passed in a heated state in a flow rate of 30 ml/min to induce reaction. The reaction product was analyzed by gas chromatography. It was consequently found that the conversion of carbon dioxide into carbon monoxide was 6% at 300° C., 17% at 400° C. and 25% at 500° C.

EXAMPLE 10

To an aqueous solution of ammonium tungstate, a fine powder of silica (920% by weight based on the amount of the ammonium tungstate) as a support was added in a stirred state. The resultant composite mixture was saturated with hydrogen sulfide and then neutralized with sulfuric acid and filtered. The filtrate was dried overnight in an atmosphere of argon at 130° C. and further heated in a current of the mixed gas consisting of hydrogen sulfide and hydrogen at a ratio of 2:1 at 510° C. for 40 minutes. As a result, there was obtained a catalyst which consisted of silica as a support and tungsten sulfide (S/W=1.99) deposited on the support. The tungsten sulfide content of this catalyst was found to be 7.8% by weight based on the amount of the silica.

In the same manner as in Example 1, through a bed of 500 mg of the produced catalyst, a mixed gas consisting of carbon dioxide, hydrogen and nitrogen at a ratio of 5:5:1 was passed in a heated state in a flow rate of 30 ml/min. The reaction product was analyzed by gas chromatography. As a result, it was found that the conversion of carbon dioxide into carbon monoxide was 4% at 300° C. 10% at 400° C. and 21% at 500° C.

EXAMPLE 11

To an ammonium sulfide aqueous solution of ammonium tungstate, a fine powder of zirconia (900% by weight based on the amount of the ammonium tungstate) as a support was added in a stirred state. The resultant composite mixture was dried and then heated in a current of oxygen at 450° C. Then, the resultant mixture was heated in a current of hydrogen sulfide at 500° C. for one hour and further heated at 510° C. for 40 minutes. As a result, there was obtained a catalyst which consisted of zirconia as a support and tungsten sulfide (S/W=1.99) deposited on the support. The tungsten sulfide content of this catalyst was 7.9% by weight based on the amount of the zirconia. In the same manner as in Example 1, through a bed of 600 mg of the produced catalyst, a mixed gas consisting of carbon dioxide, hydrogen and argon at a ratio of 1:1:1 was passed in a heated state in a flow rate of 30 ml/min to induce reaction. The reaction product was analyzed by gas chromatography. It was consequently found that the conversion of carbon dioxide into carbon monoxide was 3% at 300° C., 11% at 400° C. and 22% at 500° C.

EXAMPLE 12

To an aqueous solution of ammonium tungstate, a fine powder of neodymia (850% by weight based on the amount of the ammonium tungstate) as a support was added in a stirred state. The resultant composite mixture was dried and then heated in a current of oxygen at 450° C. for one hour and 20 minutes. Then, the mixture was heated in a current of hydrogen sulfide at 500° C. and further heated in a current of argon at 510° C. for 40 minutes. As a result, there was obtained a catalyst which consisted of neodymia as a support and tungsten sulfide (S/W=2.05) deposited on the support. The tungsten sulfide content of this catalyst was 7.8% by weight based on the amount of the neodymia.

In the same manner as in Example 1, through a bed of 300 mg of the produced catalyst, a mixed gas consisting of carbon dioxide and hydrogen at a ratio of 1:1 was passed in a heated state in a flow rate of 30 ml/min to induce reaction. The reaction product was analyzed by gas chromatography. It was consequently found that the conversion of carbon dioxide into carbon monoxide was 6% at 300° C., 15% at 400° C. and 23% at 500° C.

EXAMPLE 13

Tungsten trioxide deposited on 85% by weight of lanthania was heated in a current of the mixed gas consisting of hydrogen sulfide and hydrogen at a ratio of 1:1 at 550° C. for 45 minutes. As a result, there was obtained a catalyst which consisted of lanthania as a support and tungsten sulfide (S/W=2.31) deposited on the support and had a tungsten sulfide content of 1.1% by weight based on the amount of lanthania. In the same manner as in Example 1, through a bed of 500 mg of the produced catalyst, a mixed gas consisting of carbon dioxide, hydrogen and argon at a ratio of 7:7:1 was passed in a heated state in a flow rate of 20 ml/min to induce reaction. The reaction product was analyzed by gas chromatography. It was consequently found that the conversion of carbon dioxide into carbon monoxide was 4% at 300° C., 12% at 400° C. and 25% at 500° C.

EXAMPLE 14

Tungsten trisulfide was heated in a current of argon gas at 480° C. for 55 minutes. As a result, there was obtained a tungsten sulfide catalyst which had a S/W molar ratio of 2.42. A transparent reaction vessel of quartz glass was packed with 5 g of the produced catalyst. A mixed gas consisting of carbon dioxide, hydrogen and argon at a ratio of 3:3:1 was passed through the reaction vessel in a flow rate of 2 ml/min and, at the same time, irradiated with the sunlight condensed with a Fresnel lens 1.5 m in diameter to induce reaction. The reaction product was analyzed by gas chromatography. It was consequently found that the conversion of carbon dioxide into carbon monoxide was about 5%.

EXAMPLE 15

Tungsten trioxide was heated in a current of hydrogen sulfide at 500° C. for two hours. As a result, there was obtained a tungsten sulfide catalyst which had a S/W molar ratio of 2.29. A heat absorber of quartz glass in a linear compound parabolic solar concentrator 1 m in length and 20 cm in width was packed with 10 g of the produced catalyst. A mixed gas consisting of carbon dioxide, hydrogen and hydrogen sulfide at a ratio of 5:5:1 was passed through the solar concentrator in a flow rate of 2 ml/min and, at the same time, irradiated with the concentrated sunlight to induce reaction. The reaction product was analyzed by gas chromatography. It was consequently found that the conversion of carbon dioxide into carbon monoxide was about 8%.

What is claimed is:

1. A method for reducing carbon dioxide into carbon monoxide, consisting essentially of the steps of:
    mixing carbon dioxide and hydrogen gas in the presence of tungsten sulfide catalyst having a W:S mol ratio of from about 1.96 to 2.42 to obtain a mixed gas having a $CO_2:H_2$ mol ratio of from about 0.1 to 5; and
    supplying to said tungsten sulfide catalyst, one energy selected from the group consisting of heat and sunlight, thereby inducing reaction between said carbon dioxide and said hydrogen to convert said carbon dioxide into carbon monoxide at a temperature ranging from 300° C. to 500° C.

2. A method according to claim 1, wherein said tungsten sulfide is deposited on a catalyst support.

3. A method according to claim 2, wherein said catalyst support is at least one member selected from the group consisting of alumina, silica, activated carbon, zeolite, iron oxide, zirconia, titania, ferrite, yttria, thoria, lanthania, neodymia and activated clay.

4. A method according to claim 1, wherein said tungsten sulfide has a S/W molar ratio of not more than 2.

5. A method according to claim 1, where in said mixed gas further contains at least one gas selected from the group consisting of argon, helium, nitrogen, and hydrogen sulfide.

* * * * *